United States Patent Office 3,644,413
Patented Feb. 22, 1972

3,644,413
3-PHENYL COUMARINS
Durvasula V. Rao, Hamden, Adnan A. R. Sayigh, North Haven, and Henri Ulrich, Northford, Conn., assignors to The Upjohn Company, Kalamazoo, Mich.
No Drawing. Filed Mar. 16, 1970, Ser. No. 20,062
Int. Cl. C07d 7/28
U.S. Cl. 260—343.2                    8 Claims

ABSTRACT OF THE DISCLOSURE

Novel alkoxy-substituted 3-phenylcoumarins of the formula:

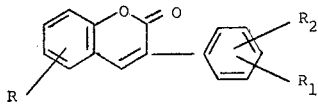

wherein R is lower alkoxy, $R_1$ is NHCOCH$_3$,
NHCOCH=CH$_2$, NCO
or $$NHCOO(CH_2CH_2O)_n-\underset{\underset{O}{\|}}{C}-\underset{\underset{R_3}{|}}{C}=CH_2$$

wherein $n$ is an integer of from 1 to 3 inclusive and $R_3$ is alkyl of from 1 to 4 inculsive carbon atoms, and $R_2$ is H or $R_1$ are prepared. Such compounds are useful, by virtue of fluorescence in ultraviolet light, as optical brighteners, as ultraviolet stabilizers for plastics such as polyethylene, polyvinylchloride, etc., in the preparation of polyurethane and vinyl polymers and in the preparation of photoresist resins.

BACKGROUND OF THE INVENTION

(1) Field of the invention

This invention relates to novel alkoxy-substituted 3-phenylcoumarin compounds and to their use as optical brighteners and in the preparation of novel polymers. More particularly, this invention is concerned with novel alkoxy-substituted 3-phenylcoumarins in which the phenyl group has one or two moieties selected from the class consisting of NHCOCH$_3$, NHCOCH=CH$_2$, NCO or
$$NHCOO(CH_2CH_2O)_n-\underset{\underset{O}{\|}}{C}-\underset{\underset{R_3}{|}}{C}=CH_2$$

wherein $n$ is an integer of from 1 to 3 inclusive and $R_3$ is alkyl of from 1 to 4 inclusive carbon atoms, as substituents thereon and to processes for synthesizing such compounds.

(2) Description of the prior art

A number of 3-phenylcoumarins have been described in the art. For example, in U.S. Pat. 2,945,033, the preparation of a variety of 7-triazinylamino-3-phenylcoumarins useful as optical brightening agents for synthetic detergents is disclosed while the synthesis of 3-phenyl-7-carbalkoxy-coumarin compounds useful for the same purpose is set forth in U.S. Pat. 2,929,822. Further, Cross et al., in U.S. Patent 3,380,955 disclose dialkylamino-substituted 7-triazinylamino-3-phenylcoumarins and suggest the use of these compounds as optical brighteners for polyester polyols.

The novel alkoxy-substituted 3-phenylcoumarin compounds of this invention are unique materials which in addition to being useful per se, can also be utilized in preparation of valuable polyureas, polyurethanes, vinyl-coumarin polymers, and for preparing photoresist systems.

SUMMARY OF THE INVENTION

The present invention comprises novel alkoxy-substituted 3-phenylcoumarins having the formula:

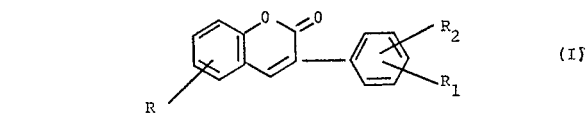

wherein R is lower alkoxy, $R_1$ is selected from the group consisting of NHCOCH$_3$, NHCOCH=CH$_2$, NCO and $$NHCOO(CH_2CH_2O)_n-\underset{\underset{O}{\|}}{C}-\underset{\underset{R_3}{|}}{C}=CH_2$$

wherein $n$ is an integer of from 1 to 3 inclusive, $R_3$ is alkyl of from 1 to 4 inclusive carbon atoms, and $R_2$ is H or $R_1$.

The term "lower-alkoxy" means alkoxy of from 1 to 6 carbon atoms, inclusive, such as methoxy, ethoxy, propoxy, butoxy, pentyloxy, hexyloxy, and isomeric forms thereof.

The monoisocyanates of Formula I above are useful in that they can be reacted with active-hydrogen containing fibers, filaments and the like, to give products which, by virtue of the double bond present in the moiety of the compound (I), fluoresce on irradiation with ultraviolet light. Accordingly, the monoisocyanates are useful as optical brightening agents by incorporation into fabrics, fibers, and like materials made of cotton, silk, feathers, wool, cellulosic materials such as wood, jute, flax, hemp, paper, and the like, all of which contain active hydrogen atoms (i.e., hydrogen atoms which give a positive response in the Zerewitinoff reaction, J. Am. Chem. Soc. 49, 3181, 1927). When used for the above purpose the monoisocyanates (I) are incorporated into the active hydrogen containing material in accordance with conventional procedures. For example, the monoisocyanates (I) can be dissolved or dispersed in a volatile inert organic medium such as hexane, benzene, toluene, xylene, chlorobenzene, o-dichlorobenzene, tetrachlorethane, acetone, methyl ethyl ketone, ethyl acetate, dioxane, dimethylsulfone, and the like, and the resulting mixture can be applied to the active hydrogen material by coating or spraying or by dipping the latter in a bath containing the isocyanate composition. Interaction of the monoisocyanates (I) and the active hydrogen containing material generally takes place spontaneously without the necessity to apply heat. The inert organic carrier medium is subsequently removed, and, if necessary, is recovered by vacuum drying or like techniques. The monoisocyanates (I) can be applied to the active hydrogen material after the latter has been formed into a finished article or, in the case of fabrics and like materials which are fabricated from fibers, filaments, and the like, the monoisocyanates (I) can be applied to the latter prior to fabrication of a desired end product.

Alternatively, the monoisocyanates (I) can be converted to stable, water-soluble derivatives which can be incorporated in aqueous treating baths such as those commonly employed in applying optical brighteners to textile and like materials. The methods commonly employed in this art are described in Encyclopedia of Chemical Technology, Edited by Kirk-Othmer, second edition, vol. 3, pp. 737 to 748, 1964, Interscience, New York. The monoisocyanates (I) can be converted to water-soluble derivatives, suitable for use in the above manner, in a variety of ways. For example, said monoisocyanates (I) can be reacted with alkanolamines such as ethanolamine, diethanolamine, diisopropanolamine, and the like, to form the corresponding hydroxyalkylureas. Alternatively, said monoisocyanates (I) can be reacted with an equimolar proportion of a polyhydric alcohol such as glycerol, trimethylolpropane, dipropylene glycol, 1,2,3-hexanetriol, butanediol, hexanediol, and the like, to form the corresponding hydroxyalkyl carbamates which exhibit the required water-solubility. In a further alternative said monoisocyanates (I) can be reacted with an equimolar proportion of a polycarboxylic acid such as maleic acid, fumaric acid, oxalic acid, phthalic acid, succinic acid, and the like, to form the corresponding mono- or polycarboxy substituted amide which can be converted to the corresponding potassium, sodium or like water-soluble salt.

Similarly, compounds of Formula I having a mono-substituted amino group can be converted to water-soluble derivatives which are employed as optical brightening agents in accordance with the procedures set forth above. For example, such compounds can be reacted, using procedures well-known in the art, with dicarboxylic acids such as those exemplified above or with the anhydrides thereof, to form the corresponding half-amides of said acids. The half-amides can then be converted to the corresponding potassium, sodium, or like water-soluble salts.

The monoisocyanates (I) can also be employed as analytical tools in biochemical and like research. For example, the metabolic processes undergone by pharmaceutical agents containing one or more active hydrogen atoms in the molecule, or by proteinaceous materials and the like, in the human or animal body can be followed by tagging the molecule of said material by reaction with the monoisocyanate (I) thereby rendering said material fluorescent under the influence of ultraviolet light. The subsequent progress of the tagged molecule can be followed by observing the appearance of the fluorescence corresponding to the tagged material at various sites in the human or animal organism.

Both the mono- and polyisocyanates of Formula I and the compounds of Formula I having a mono-substituted amino group are also useful in the preparation of photoresist resins, light sensitive polymers and the like. For example, light sensitive polymers can be prepared by incorporating the isocyanates of Formula I into elastomeric polyurethanes by replacing part or, in the case of the diisocyanates of Formula I, the whole of the polyisocyanate normally used by an isocyanate of the Formula I; conventional procedures for the synthesis of such polyurethanes are described by Saunders et al., Polyurethanes, Chemistry and Technology, Part II, Interscience Publishers, 1964, pp. 299–451. The elastomers so obtained can be formed into any desired shape by molding, extruding, blowing and like procedures and then the finished product can be cured by irradiation using light energy of the appropriate wavelength whereby cross linking occurs between the photosensitive double bonds introduced into the polymer molecule by the isocyanate (I).

Similarly, compounds of Formula I having a mono-substituted amino group can be incorporated into polyamides, and like polymers using procedures well-known in the art for the preparation of such polymers from diamines, the compound of Formula I having a mono-substituted amino group being used as part or as the whole of the amine component used to prepare the polymers. Representative procedures for the preparation of polyamides are those shown in Kirk-Othmer, ibid, vol. 10, p. 924 et seq. Said polyamides can be formed into any desired shape by molding, extruding, blowing and like techniques and the finished product can be cured by irradiation using light energy of the appropriate wavelength whereby cross linking occurs between the photosensitive double bonds introduced into the original polymer molecule via the compounds of Formula I having a mono-substituted amino group.

The isocyanates of Formula I and/or the compounds of Formula I having a mono-substituted amino group can be used in the preparation of photoresist resins. Thus, such compounds can be incorporated into polymers which are useful as auxiliaries in the photographic reproduction art. For example, said polymers can be applied as a solution to paper, metal, and like film supports normally employed in the reproduction art, to form a film on said support. Using the supported film so produced, it is possible to produce prints from negatives, e.g., lines, screened or half tone negatives or diapositives, by interposing the negative between a source of light and the supported film. The photosensitive polymer in those portions of the supported film which receive light is crosslinked by the action of the light and rendered insoluble. The amount of crosslinking is directly proportional to the amount of light received. After exposure of the film the polymer which has not been affected by the light is dissolved out by means of a solvent, leaving the crosslinked, insoluble, light-sensitized polymer on the surface of the film support in the form of a positive image corresponding to the negative used in the irradiation step. Said image is resistant to solvents, acids, alkalies, water, etc., as well as to abrasion, mechanical stresses and the like and hence possesses obvious advantages over images prepared by hitherto conventional reproduction processes.

The processes by which the isocyanates (I) and the compounds of Formula I having a mono-substituted amino group are incorporated into such photosensitive polymers include the various processes known in the art for making supported and unsupported films of polyurethanes, polyamides and the like, supra, as well as those described in, for example, U.S. Pat. 2,948,706. The latter patent is also representative of the procedures known in the art for the utilization of photosensitive polymers in the above-discussed methods of reproduction. Said procedures can be readily adapted to the same use of photosensitive polymers prepared from the isocyanates (I) and the compounds of Formula I having mono-substituted amino group. Further illustrative of the methods by which such compounds can be incorporated into light sensitive polymers are those discussed in detail by J. Korsar, Light Sensitive Systems, John Wiley and Sons, Inc., New York, 1965, particularly at pp. 137–157.

The compounds of Formula I which have as a substituent the

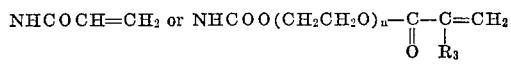

moieties can be polymerized to yield photosensitive polymers using any of the wide variety of processes known in the art for making vinyl polymers. A number of suitable methods are described by Sorenson et al., Preparative Methods of Polymer Chemistry, Interscience Publishers, New York, 1968, pp. 214–287, by Billmeyer, Textbook of Polymer Science, Interscience Publishers, New York, 1966, pp. 394–418 and in U.S. Pats. Nos. 2,520,959, 2,772,257, and 2,843,576. Likewise, the compounds of Formula I can be copolymerized with other well-known vinyl monomers such as styrene, acrylonitrile, fumaronitrile, 2,5-dichlorostyrene, methyl methacrylamide, vinyl acetate, vinyl chloride, vinyl butyral, vinyl isocyanate, vinyl azide, vinylsulfonyl fluoride, butyl vinyl sulfone, etc.

DETAILED DESCRIPTION OF THE INVENTION

The novel isocyanates of the Formula I are obtained conveniently by phosgenation of the corresponding amines of the formula:

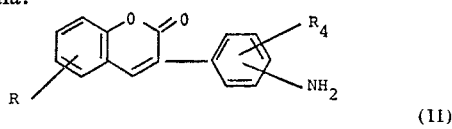

(II)

wherein R has the same meaning as previously set forth and $R_4$ is H or $NH_2$. The phosgenation can be effected by any of the procedures conventionally employed in the art to convert an aromatic amine to the corresponding isocyanate. Such procedures are described, for example, by Siefken, Annalen, 562, 75 et seq., 1949. Illustratively, the free amine (II) or an acid addition salt thereof such as the hydrochloride, hydrobromide, and the like, is treated with phosgene in the presence of an inert organic solvent such as benzene, toluene, xylene, naphthalene, decalin, chlorobenzene, o-dichlorobenzene, bromobenzene, o-chlorotoluene, and the like. The reaction is conducted advantageously at elevated temperatures and preferably at temperatures of the order of 100° C. to 200° C. The phosgene is conveniently employed in approximately stoichiometric proportions but an excess of phosgene can be employed is desired.

The amines of Formula II can be prepared by hydrogenation at moderate pressure (i.e., up to about 50 p.s.i.g.) of the corresponding nitro derivatives of the formula:

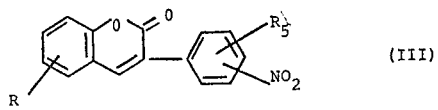

wherein R has the same meaning as previously described and $R_5$ is selected from the group consisting of H and $NO_2$. The reaction is conveniently conducted at a temperature of about 25° C. to about 30° C. in the presence of a catalyst such as Raney nickel, a noble metal as exemplified by platinum, palladium, rhodium, etc., and mixtures thereof. Preferably, the reaction is conducted in the presence of an inert organic solvent such as methanol, ethanol, n-propanol, isopropanol, etc. Synthesis of the amine starting materials of Formula II is more completely described in Preparations 1–2 which follow and in Rao, Sayigh and Ulrich application Ser. No. 20,063, for Novel Chemical Compositions and Process, filed of even date herewith.

The novel compounds of this invention of Formula I where at least one of $R_1$ and $R_2$ is

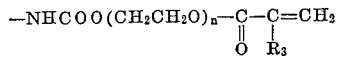

are prepared by reacting a mono- or diisocyanate of Formula I with an acrylate of the formula:

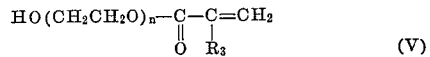

wherein $n$ and $R_3$ are as previously defined. The reaction is preferably conducted in the presence of an inert solvent such as benzene, toluene, chlorobenzene, bromobenzene, decalin, o-dichlorobenzene, etc. at a temperature of from about 80° C. to about 180° C. Generally, approximately stoichiometric quantities of the two reactants are employed although, if desired, a slight excess of the acrylate can be added. The product usually precipitates from the reaction mixture on cooling, otherwise, recovery of the product can be achieved in a variety of ways well-known in the art such as by concentration of the reaction mixture and cooling.

Synthesis of the acrylates of Formula V can be accomplished by methods well-known in the art, such as by reacting a polyethylene glycol with the acid chloride of the corresponding acrylic acid in the presence of a catalyst such as thiethylamine, pyridine, piperidine, etc. For example, the compound:

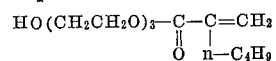

can be prepared by heating under refluxing conditions stoichiometric quantities of triethylene glycol with n-butylacrylyl chloride in benzene and in the presence of triethylamine.

Preparation of the novel N-acetyl derivatives of Formula I can be synthesized by reacting, for example, acetic anhydride with the corresponding amine compound (II). Preferably, the reaction is conducted by contacting the amine compound (II) with acetic anhydride at room temperature. The product can be recovered in a variety of ways well-known in the art such as, for example, by adding water, thus causing the acetyl product to precipitate from the reaction mixture after which it can be removed by filtration, centrifugation and like procedures.

Reaction of the amine compound of Formula II with acrylyl chloride yields the corresponding N-acrylyl derivative of Formula I. Generally, about stoichiometric quantities of the reactants are employed, however, a slight excess of the acrylyl chloride can be added, if desired. The reaction is conveniently conducted at a temperature of from about 25° C. to about 30° C. in the presence of an inert organic solvent which can be, for example, benzene, toluene, xylene, chlorobenzene, o-dichlorobenzene or bromobenzene and in the presence of an acid scavenger, such as triethylamine, piperidine, pyridine, etc. The product generally precipitates from the reaction mixture and further recovery can be achieved by evaporating a portion of the solvent, cooling the remainder of the reaction mixture to room temperature and finally separating the product which precipitates by filtration, decantation, etc. or by any other convenient method.

The following preparations and examples illustrate the manner and process of making and using the invention and set forth the best mode contemplated by the inventors of conducting the invention but are not to be construed as limiting.

PREPARATION 1

*3-(4'-aminophenyl)-6-methoxycoumarin*

To 12 g. of 3 - (4' - nitrophenyl)-6-methoxycoumarin in 700 ml. of methanol was added 4.0 g. of wet Raney nickel catalyst and the mixture hydrogenated at a pressure of 51 p.s.i.g. Over a period of eight hours the required amount of hydrogen was absorbed. The mixture was filtered and, after evaporation of the solvent, there was obtained 10 g. (92.5 percent of the theoretical yield) of 3 - (4- - aminophenyl) - 6-methoxycoumarin of the formula:

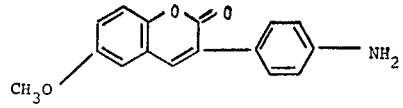

having a melting point of 149–150° C. after recrystallization from benzene.

*Analysis.*—Calc'd for $C_{16}H_{13}NO_3$ (percent): C, 71.90; H, 4.90; N, 5.24. Found (percent): C, 71.63; H, 4.82; N, 5.12.

PREPARATION 2

Following the procedure of Preparation 1 but using in place of 3-(4'-aminophenyl)-6-methoxycoumarin as a reactant:

3-(2'4'-dinitrophenyl)-7-methoxycoumarin,
3-(3'5'-dinitrophenyl)-6-methoxycoumarin,
3-(2'-nitrophenyl)-7-n-pentyloxycoumarin,
3-(4'-nitrophenyl)-6-isobutoxycoumarin, or
3-(3'-nitrophenyl)-8-isooctyloxycoumarin, there are obtained in good yield:

3-(2',4'-diaminophenyl)-7-methoxycoumarin,
3-(3',5'-diaminophenyl)-6-methoxycoumarin,
3-(2'-aminophenyl)-7-n-pentyloxycoumarin,
3-(4'-aminophenyl)-6-isobutoxycoumarin, and
3-(3'-aminophenyl)-8-isooctyloxycoumarin, respectively.

EXAMPLE I

*3-(4'-isocyanatophenyl)-6-methoxycoumarin*

To a solution of excess phosgene in 200 ml. of chlorobenzene a solution of 8.8 g. of 3-(4'-aminophenyl)-6-methoxycoumarin in 100 ml. of chlorobenzene was added at room temperature over a period of 12 minutes. Heating at 90–100° C. for several hours gave a clear solution after which the excess phosgene was removed by purging with nitrogen. Evaporation of the solvent gave 9.5 g. (98 percent of the theoretical yield) of 3-(4'-isocyanatophenyl)-6-methoxycoumarin of the formula:

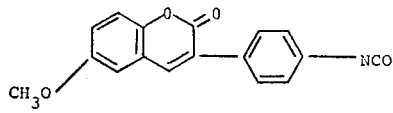

having a melting point of 184–185° C.

A portion of the isocyanate product thus-obtained was converted to the corresponding methyl carbamate as follows:

A solution of 7 g. of 3-(4'-isocyanatophenyl)-6-methoxycoumarin in 200 ml. of methanol was allowed to stand overnight at room temperature. The precipitated methyl carbamate (7.5 g., 97 percent of the theoretical yield) of the formula:

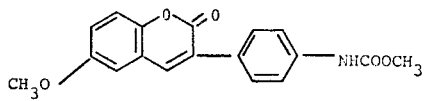

was recrystallized from ethyl acetate to give light yellow crystals having a melting point of 188–190° C.

*Analysis.*—Calc'd for $C_{18}H_{15}NO_5$ (percent): C, 66.45; H, 4.65; N, 4.31. Found (percent): C, 66.68; H, 4.64; N, 4.28.

A solution of the above methyl carbamate (0.1 percent by weight in methanol) exhibits an intense greenish-blue fluorescence.

EXAMPLE II

The photosensitivity of the methyl carbamate derived in Example I was determined as follows:

A solution of 0.5 g. of the methyl carbamate derived from 3-(4'-isocyanatophenyl)-6-methoxycoumarin was irradiated for four hours with a 450 watt Hanovia mercury lamp (Type L, 679A). Removal of a portion of the solvent by evaporation yielded 0.4 g. (80 percent of the theoretical yield) of the photodimer having a melting point of 255–260° C. After recrystallization from glacial acetic acid, the dimer melted at 269–270° C.

*Analysis.*—Calc'd for $(C_{36}H_{30}N_2)_{10}$ (percent): C, 66.45; H, 4.65; N, 4.31. Found (percent): C, 66.46, H, 4.78, N, 4.25.

The above result illustrates the high degree of photosensitivity possessed by the carbamates derived from the products of this invention.

EXAMPLE III

Following the method of Example I but replacing 3-(4'-aminophenyl)-6-methoxycoumarin as a reactant with:

3-(2',4'-diaminophenyl)-7-methoxycourmarin,
3-(3',4'-diaminophenyl)-6-methoxycoumarin,
3-(2'-aminophenyl)-7-n-pentyloxycoumarin,
3-(4'-aminophenyl)-6-isobutoxycoumarin, or
3-(3'-aminophenyl)-8-isooctyloxycoumarin, there are obtained in good yield:

3-(2',4'-diisocyanatophenyl)-7-methoxycoumarin,
3-(3',4'-diisocyanatophenyl)-6-methoxycoumarin,
3-(2'-isocyanatophenyl)-7-n-pentyloxycoumarin,
3-(4'-isocyanatophenyl)-6-isobutoxycoumarin, and
3-(3'-isocyanatophenyl)-8-isooctyloxycoumarin, respectively.

EXAMPLE III 3-(N-acetyl-4'-aminophenyl)-6-methoxycoumarin

A solution of 1 g. of 3-(4'-aminophenyl)-6-methoxycoumarin in 10 ml. of acetic anhydride was maintained for several hours at room temperature. On addition of water, the solid N-acetyl derivative of the formula shown below precipitated:

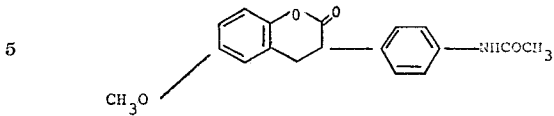

EXAMPLE IV

Utilizing the procedure of Example III but substituting for 3-(4'-aminophenyl)-6-methoxycoumarin as a reactant:

3-(2',4'-diaminophenyl)-7-methoxycoumarin,
3-(4'-aminophenyl)-6-isobutoxycoumarin, and
3-(3'-aminophenyl)-8-isooctyloxycoumarin, there are obtained in comparable yield:

3-(N,N'-diacetyl-2',4'-diaminophenyl)-7-methoxycoumarin,
3-N-acetyl-4'-aminophenyl)-6-isobutoxycoumarin, and
3-(N-acetyl-3'-aminophenyl)-8-isooctyloxycoumarin, respectively.

EXAMPLE V

To a solution of 5 grams of 3-(2'-isocyanatophenyl)-7-n-pentyloxycoumarin in 100 ml. of toluene there is added a solution of 2.0 g. of

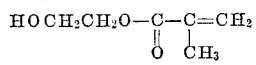

and 2.0 g. of triethylene diamine in 100 ml. of toluene and the resulting mixture is heated at 100° C. for 30 minutes Evaporation of a portion of the solvent followed by cooling to room temperature gives in good yield the product of the formula:

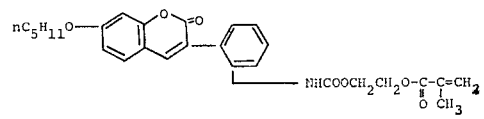

EXAMPLE VI

To a solution of 6 g. of 3-(4'-aminophenyl)-6-methoxycoumarin and 2.0 g. of triethylamine in 150 ml. of chlorobenzene is added with stirring at room temperature a solution of 1.7 g. of acrylyl chloride in 50 ml. of chlorobenzene. The precipitate which forms is recovered from the reaction mixture by filtration and is washed with water. A good yield of 3 - (N - acrylyl - 4' - aminophenyl)-6-methoxycoumarin of the formula:

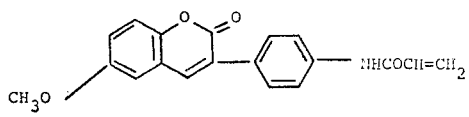

is thus obtained.

One of the problems associated with the preparation of liquids polyester polyols is the difficulty experienced in manufacturing water-white materials. In preparing such polyester polyols which are useful for the production of polyurethane plastics, the formation of color bodies generally cannot be avoided. In the usual manufacturing process the polyester polyols are prepared by condensing a polycarboxylic acid with a stoichiometric excess of a polyhydric alcohol. The ingredients are usually heated at a temperature of about 200° C. under partial vacuum down to about 10 mm. Hg and, because of these conditions together with accompanying oxidation reactions, the thus-formed polyester polyols usually have a yellow tinge.

As previously pointed out all the compounds of Formula I are useful as optical brighteners and when added in small amounts to polyester polyols along with an organic solvent soluble blue dye, such as a calco violet having the structure:

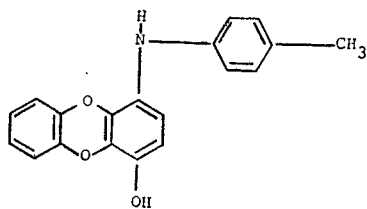

the result is water-white polyester polyol particularly suitable for the production of white polyurethane plastics. Generally about 0.00001 to about 0.0005 percent by weight of the compound of Formula I and about 0.00001 to about 0.0005 percent by weight of the soluble dye are added to the polyester polyol to achieve the valuable water-white products. For example, a highly valuable water-white polyester polyol can be prepared by adding to 100 kilograms of polyol having a molecular weight of about 2000, prepared by condensing about 16 moles of adipic acid with about 16 moles of diethyleneglycol and about 1 mole of trimethylolpropane and heating under partial vacuum to a temperature of about 250° C. until a hydroxyl number of about 56 is achieved, about 0.39 g. of 3 - (4' - isocyanatophenyl) - 6 - isobutoxycoumarin and an equal amount of the calco violet dye described above.

The novel compounds (I) of this invention are useful as light (ultraviolet) stabilizers for plastics, such as ethylene, polypropylene, etc. and for polyvinylchloride, etc.

Plastic and polymeric materials generally undergo degradation as a result of exposure to light and/or heat. To increase the useful life of plastics, such as polyethylene, polypropylene, etc., which are especially sensitive to ultraviolet light degradation, certain chemical compositions, usually known as ultraviolet absorbers, or stabilizers which serve to absorb the incident actinic radiation, are commonly incorporated in such plastics. The compounds of this invention are particularly useful as ultraviolet absorbers and they can be introduced into the polymeric materials mentioned above by any of the commonly employed practices for mixing compounding ingredients with resins and plastics, such as by milling on heated rolls, dry blending, solvent deposition, etc. To protect poly-alpha olefins and other plastics from prolonged exposure to sunlight, from about 0.05 to about 4.0 percent or more, based on the weight of the polymer, is incorporated into the polymer composition. For example, a dry blend of crystalline polypropylene and 0.08 percent by weight of 3 - (N - acetyl - 4' - aminophenyl) - 6 - methoxycoumarin is compression molded at 255° C. into 20 mil sheets which exhibit on prolonged exposure to light no evidence of surface crazing, coloration or staining.

The novel compounds (I) of this invention can be used to prepare valuable polymers, for example, by the reaction of the NCO group with polyvinyl alcohol, by copolymerization of the vinyl derivatives, etc. The thus-prepared polymers can be dissolved in suitable solvents and utilized to coat plastics such as polyvinylchloride, polyethylene, polypropylene, polystyrene, polyphenylene oxides, polysulfones, ABS, etc. in the form of film, molded articles, extrusions, etc. thus providing these materials with an effective transparent colorless filter which functions to protect the plastic from the degradative effects of light. Generally, a solution of about 0.5 to about 5 percent by weight or more of one or more of the polymers derived from the novel compounds (I) of this invention in a solvent such as methanol, ethanol, propanol, tetrahydrofuran, acetone, cyclohexanone, etc. is utilized to coat the surface of the plastic to a thickness of about 0.00005 to about 0.0005 inch or more by dipping, spraying, brushing, roller coating or by any other convenient method. For example, in a continuous operation a sheet of 2 mil polyvinylchloride film is passed at a speed of about 15 ft./sec. through a cleaning and etching bath (temperature—25° C.) comprising, by weight, about 90 percent sulfuric acid, about 2.0 percent chromic acid, about 0.025 percent of a perfluoroalkyl-type surfactant, with the balance being water, following which the sheet is sent successively through two water rinsing tanks and then through a hot-air tunnel dryer maintained at a temperature of 72° C. The dry sheet is passed through a bath heated to a temperature of about 65° C. containing a 0.5 percent by weight solution of a polycarbamate derived from 3 - (4' - isocyanatophenyl) - 6 - methoxycoumarin in ethanol after which the treated film is sent through a second hot-air tunnel dryer operating at a temperature of about 75° C. to effect removal of the solvent. The resulting coated film has on each surface an adherent coating of about 0.0002 inch in thickness of the polycarbamate derived from 3 - (4' - isocyanatophenyl)-6-methoxycoumarin which acts as a highly effective surface filter to prevent deterioration of the polyvinylchloride film on exposure to light.

What is claimed is:
1. A compound of the formula:

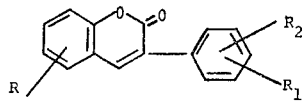

wherein R is lower alkoxy; $R_1$ is selected from the group consisting of $NHCOCH_3$, $NHCOCH=CH_2$, NCO, and

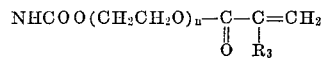

wherein $n$ is an integer of from 1 to 3 inclusive and $R_3$ is alkyl of from 1 to 4 inclusive carbon atoms, and $R_2$ is H or $R_1$.

2. The compound of claim 1 wherein R is methoxy.
3. The compound of claim 1 wherein R is methoxy, $R_1$ is $NHCOCH_3$, and $R_2$ is H.
4. The compound of claim 1 wherein R is methoxy, $R_1$ is NCO and $R_2$ is H.
5. The compound of claim 1 wherein R is methoxy, $R_1$ is $NHCOCH=CH_2$ and $R_2$ is H.
6. The compound of claim 1 wherein R is methoxy, $R_2$ is

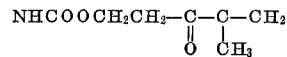

and $R_2$ is H.
7. 3-(4'-isocyanatophenyl)-6-methoxycoumarin.
8. 3-(N-acetyl-4'-aminophenyl)-6-methoxycoumarin.

References Cited
UNITED STATES PATENTS 2,929,822  3/1960  Hausermann _____ 260—343.2
3,351,482  11/1967  Raue _____ 260—343.2

JOHN M. FORD, Primary Examiner

U.S. Cl. X.R.

252—301.2 W, 8.6; 260—45.8 A; 117—159; 162—160